United States Patent
Gilles et al.

(10) Patent No.: US 7,567,685 B2
(45) Date of Patent: Jul. 28, 2009

(54) ROBUST DETECTION OF A REFERENCE IMAGE DURING MAJOR PHOTOMETRIC TRANSFORMATIONS

(75) Inventors: Sebastien Gilles, Paris (FR); Alexandre Winter, Washington, DC (US); Nathalie Poirier, Montréal (CA)

(73) Assignee: LTU Technologies, Paris (FR)

( * ) Notice: Subject to any disclaimer, the term of this patent is extended or adjusted under 35 U.S.C. 154(b) by 702 days.

(21) Appl. No.: 10/523,707

(22) PCT Filed: Aug. 4, 2003

(86) PCT No.: PCT/FR03/50024
§ 371 (c)(1),
(2), (4) Date: Nov. 14, 2005

(87) PCT Pub. No.: WO2004/015590
PCT Pub. Date: Feb. 19, 2004

(65) Prior Publication Data
US 2006/0104598 A1    May 18, 2006

(30) Foreign Application Priority Data
Aug. 5, 2002    (FR)    ................................. 02 09941

(51) Int. Cl.
*G06K 9/00* (2006.01)
*H04N 5/91* (2006.01)

(52) U.S. Cl. .................. 382/100; 382/305; 382/306; 386/46; 386/69; 386/125

(58) Field of Classification Search ................. 382/100, 382/305, 306; 386/46, 69, 125; 348/552; 707/4
See application file for complete search history.

(56) References Cited

U.S. PATENT DOCUMENTS

| 6,400,890 B1 * | 6/2002 | Nagasaka et al. | 386/69 |
| 7,181,127 B2 * | 2/2007 | Nagasaka et al. | 386/69 |
| 7,254,311 B2 * | 8/2007 | Nagasaka et al. | 386/69 |

FOREIGN PATENT DOCUMENTS

EP    0 878 767 A1    11/1998

OTHER PUBLICATIONS

Entropy and multiscale analysis: A New Feature Extraction Algorithm for Aerial Images, Winter et al Apr. 21, 1997.*
Abstract translation text for EP 0878767, Nov. 1998.*
Alexandre Winter et al., Entropy and Multiscale Analysis: A New Feature Extraction Algorithm for Aerial Images, Acoustics, Speech, and Signal Processing, 1997., IEEE International Converence on Munich, Germany Apr. 21-24, 1997, pp. 2765-2768.

* cited by examiner

*Primary Examiner*—Vikkram Bali
*Assistant Examiner*—Nancy Bitar
(74) *Attorney, Agent, or Firm*—RatnerPrestia

(57) ABSTRACT

The present invention pertains to a method and a system for identifying a specific image within a flow of images. The system calculates a reference index of the specific image, and current indexes of the current images of said flow. The index has the form of an ordered and finite set of values encoding the content of the current image. The system also compares the reference index with the current index of the current image of the monitored flow. It is thus possible to detect a specific image within a flow with great precision and extremely fast while being robust during major photometric alterations.

13 Claims, 8 Drawing Sheets

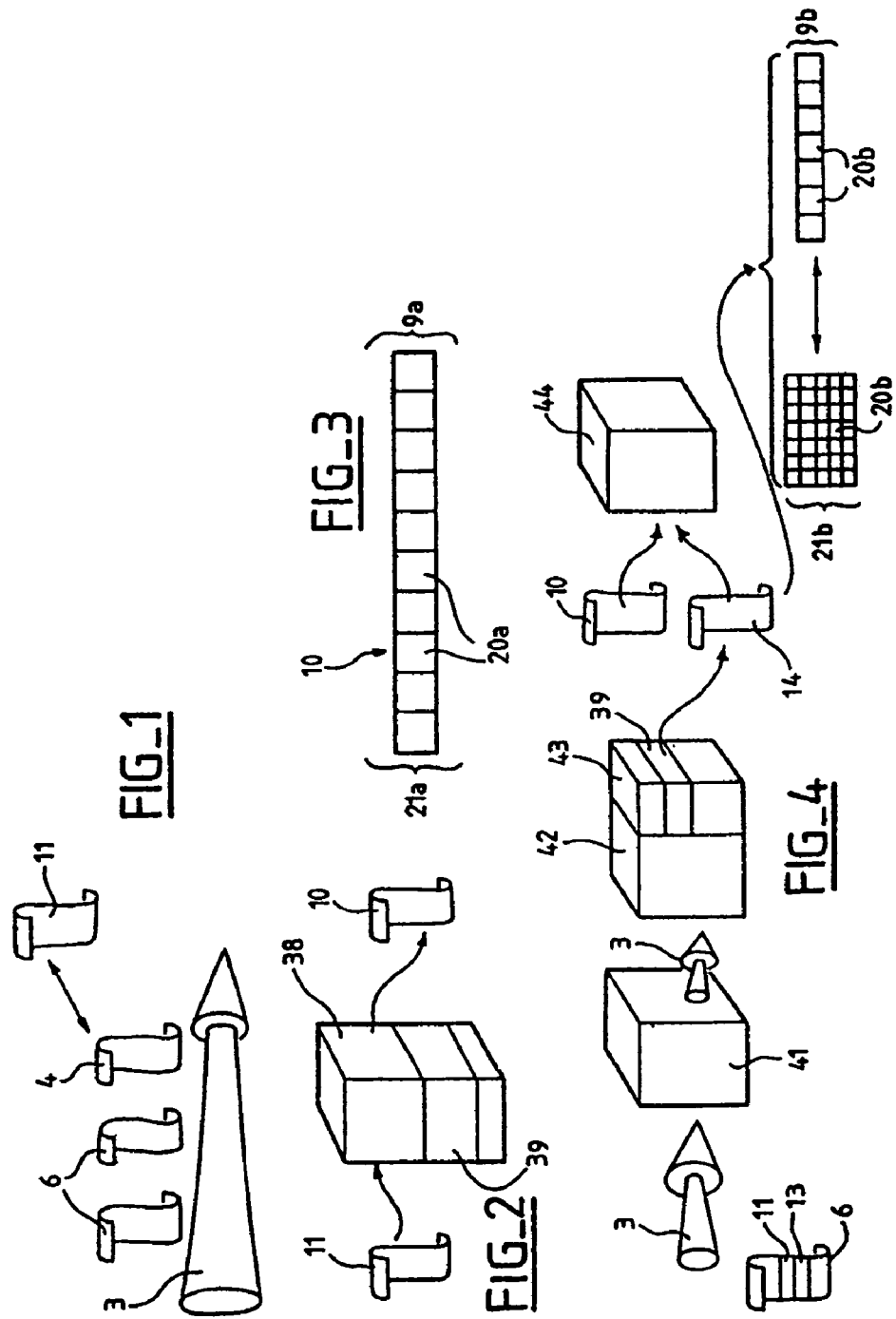

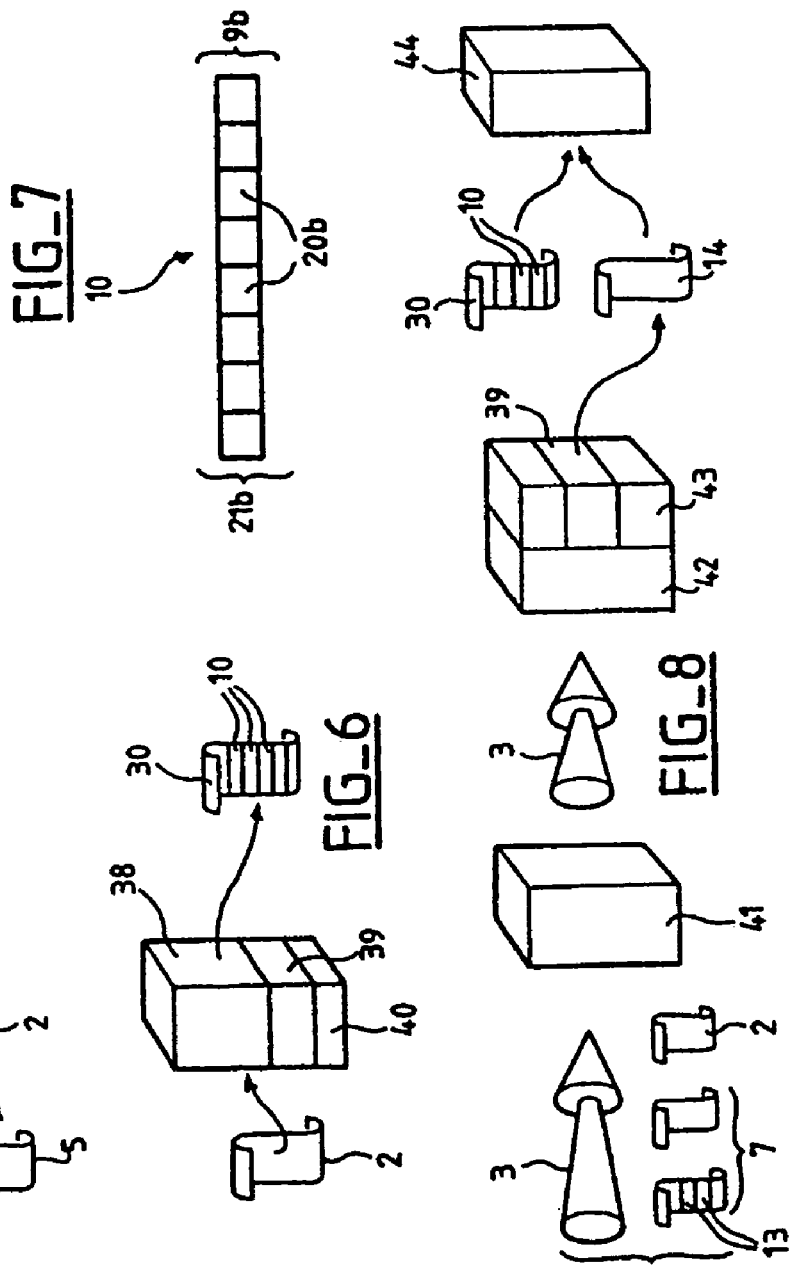

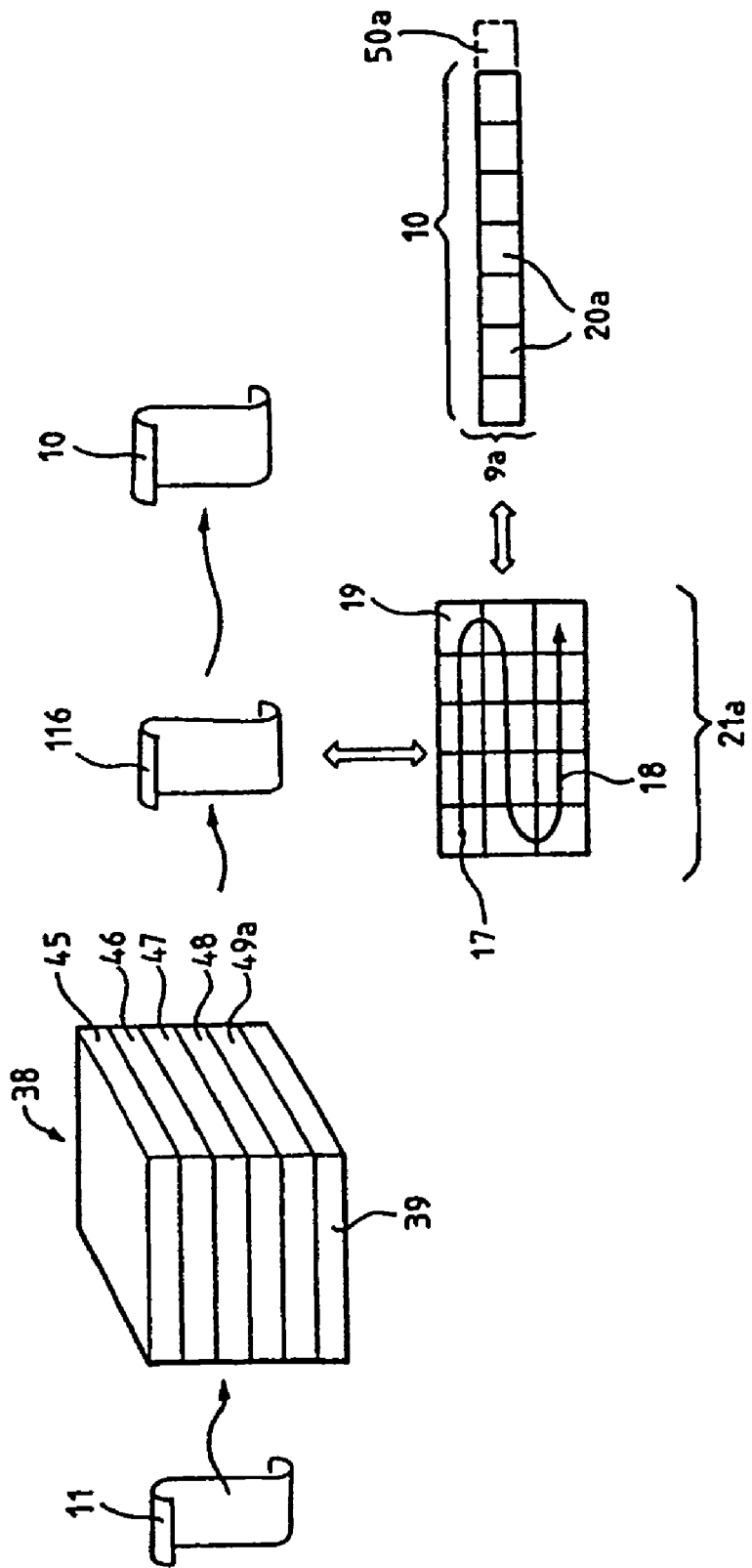
FIG_9

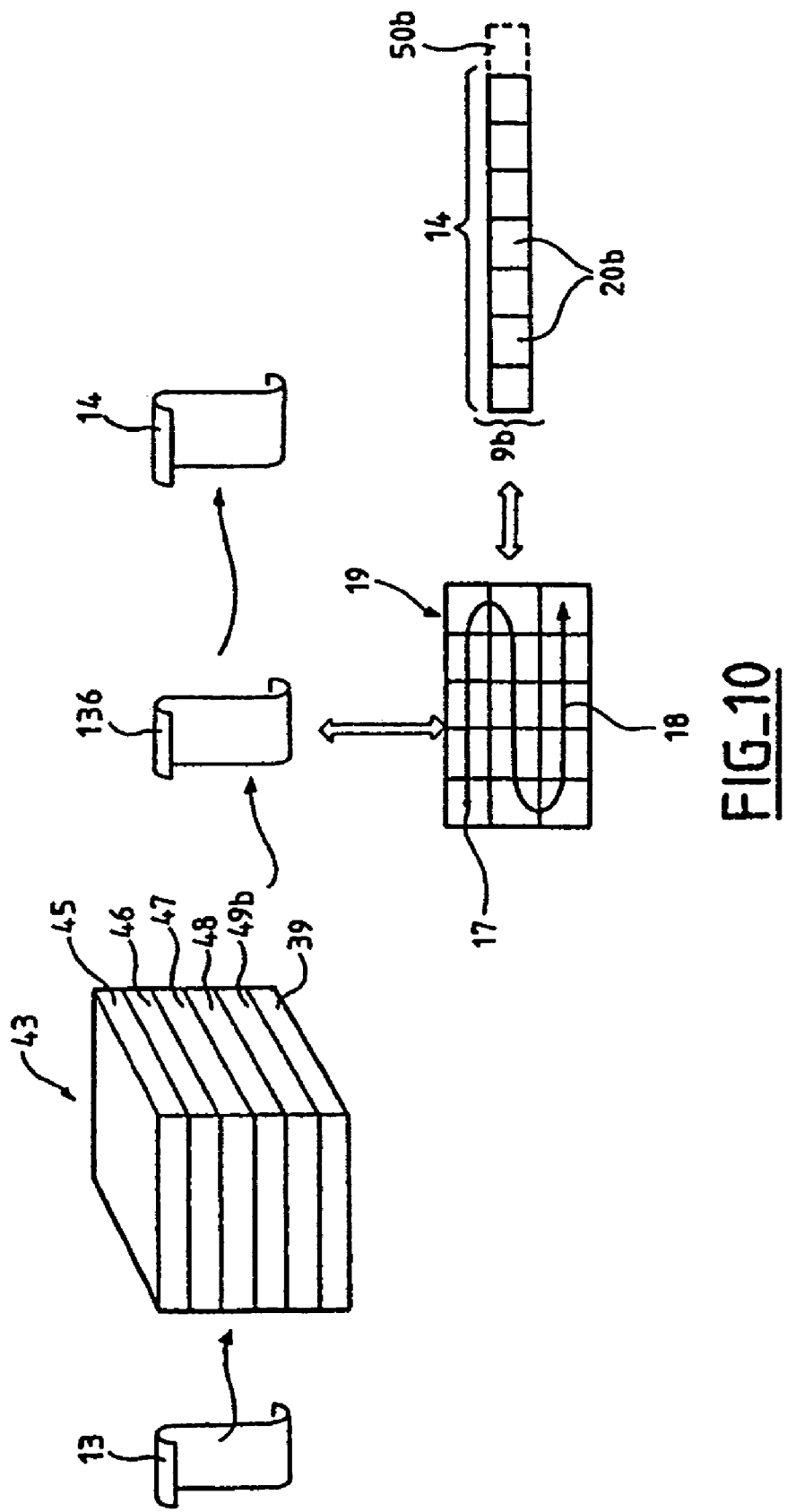

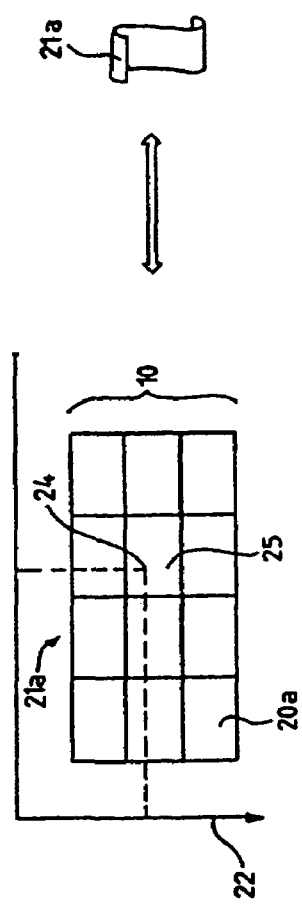
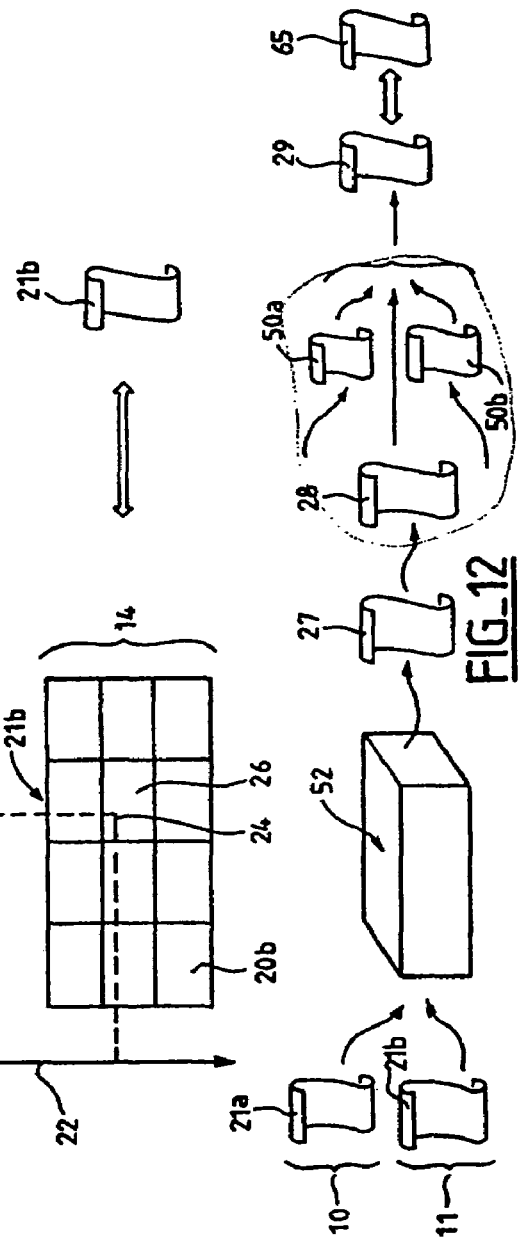

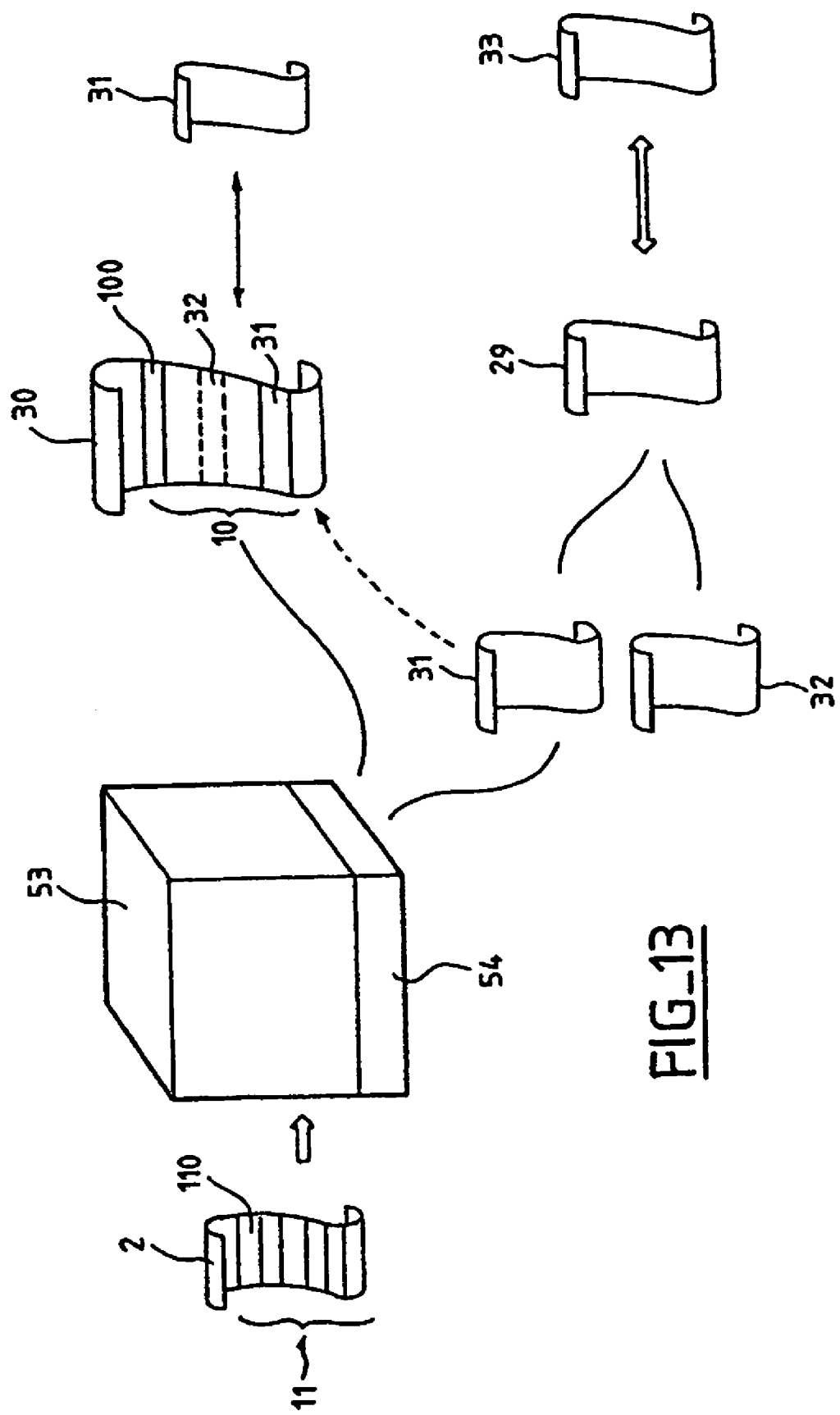
FIG_13

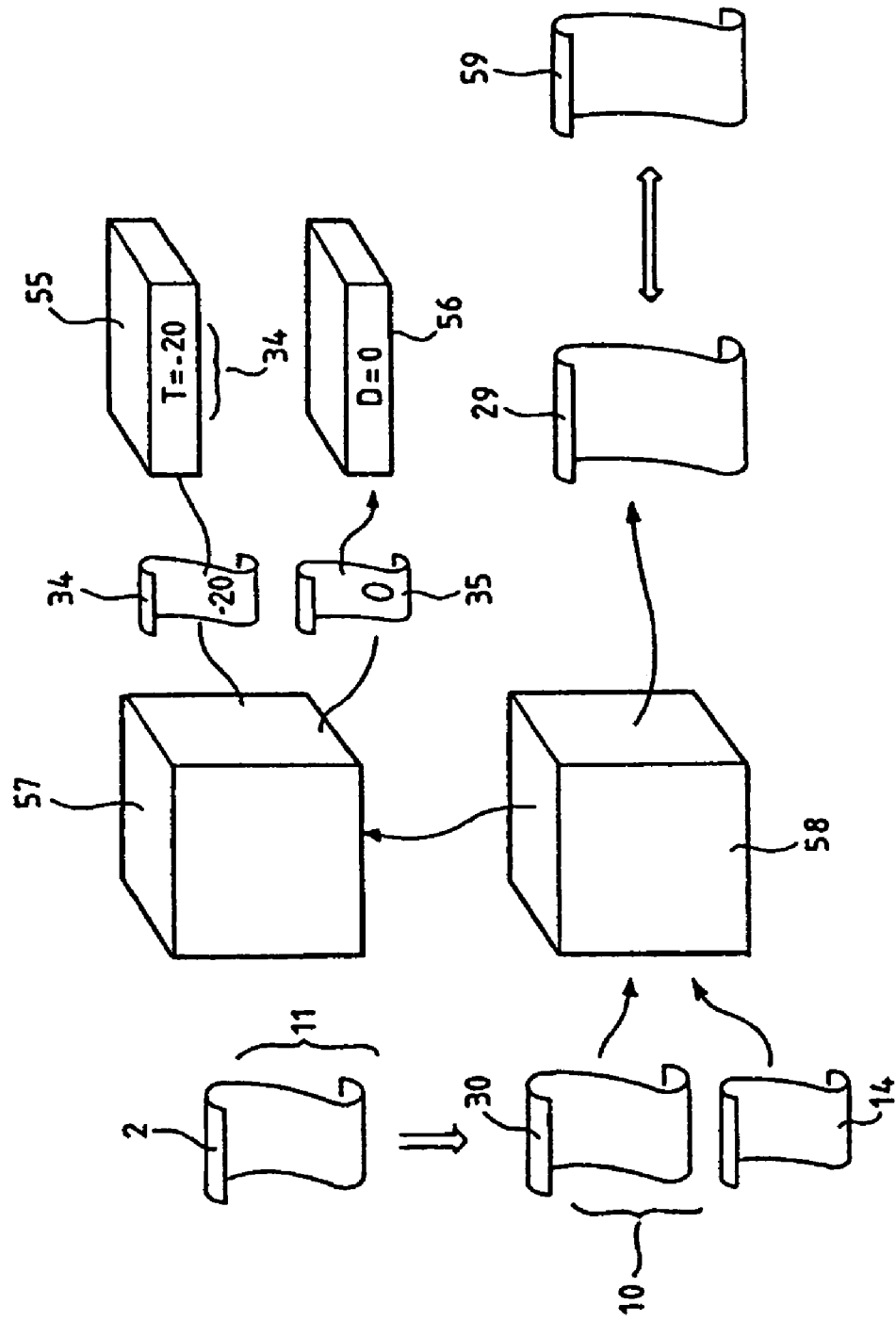
FIG_14

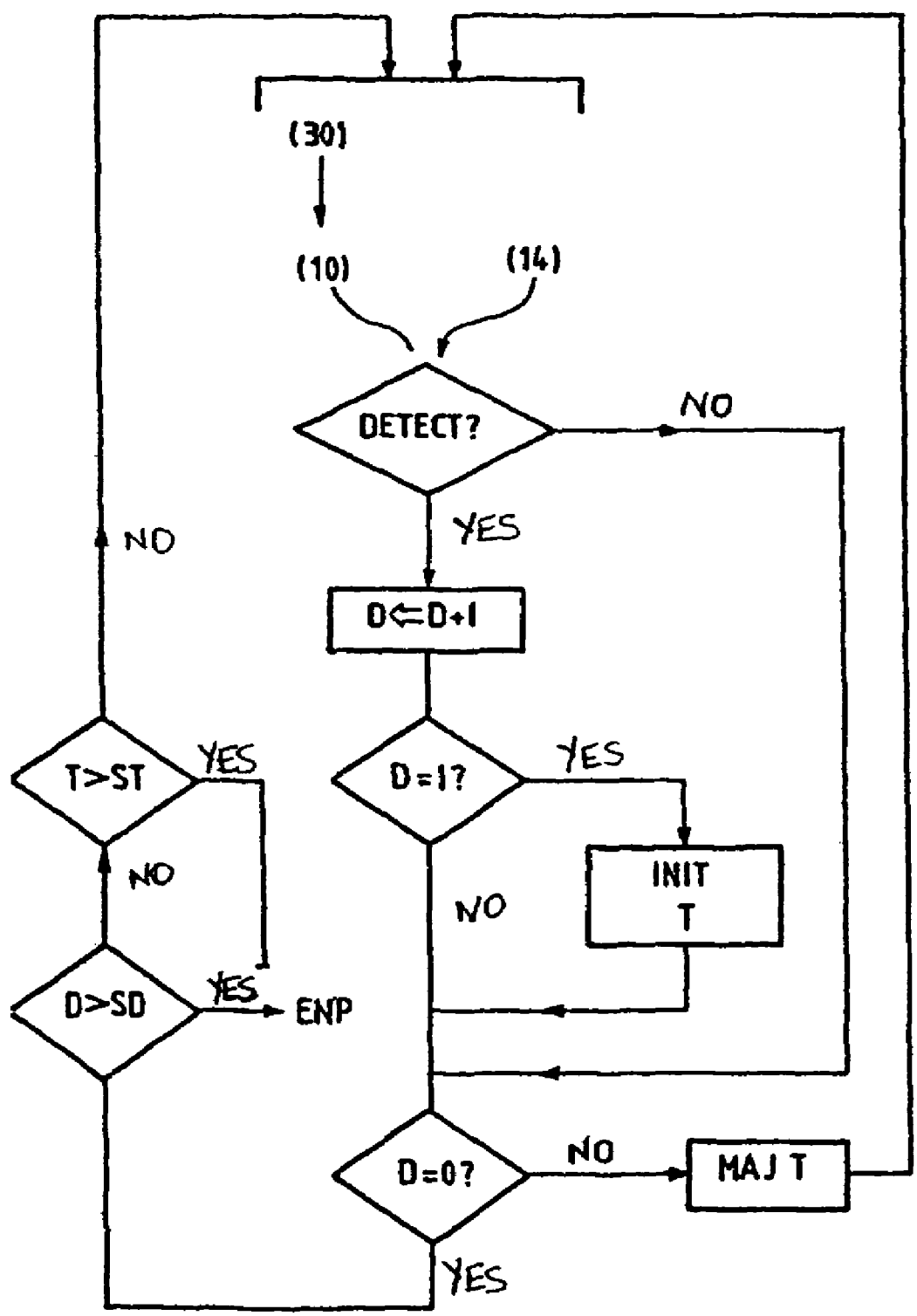
FIG_15

ROBUST DETECTION OF A REFERENCE IMAGE DURING MAJOR PHOTOMETRIC TRANSFORMATIONS

FIELD OF THE INVENTION

The present invention pertains to a method and a system for identifying a specific image and/or a specific audiovisual sequence within any flow of images or of audiovisual sequences, and in particular with the prospect of being able to identify a proprietary image within the flow and/or of being able to identify, preferably in real time, a plurality of proprietary audiovisual sequences within the flow.

BACKGROUND

In the field of monitoring protected audiovisual contents, one of the problems concerns the identification of a proprietary video sequence during its broadcast. Since a video sequence is a stream of images, the solution to the problem implies being able to detect and identify a particular image (called a reference image) in real time, while being robust during a certain number of photometric transformations, which may affect the image during its broadcast.

SUMMARY OF THE INVENTION

The solution to this problem:
must be robust with small differences in features,
must make fast calculations possible,
must have a strong discriminating power.

SOLUTION

The Method According to the Present Invention

The method comprises the step of calculating, for each image, an index appearing in the form of a characteristic vector, encoding the content of the image. The index calculation process is hereinafter called the indexing process.

The method comprises the following steps using the indexing process:

the step of calculating a reference index, using the indexing process for the specific image, or the step of extracting reference indexes from the specific audiovisual sequence so as to form a reference set of reference indexes.

Characteristic reference indexes of the specific image and/or of the specific audiovisual sequence are thus obtained.

The method additionally comprises the step of calculating an index for current images of the flow, using the indexing process for the current images of the flow. The index thus calculated is hereinafter called the current index.

The method comprises the step of comparing the reference indexes with the current index of the current image of the flow monitored. It is thus possible to detect a specific image within a flow with great precision and extremely fast, while being robust during major photometric alterations.

Indexing Process

Preferably, according to the present invention, the method is such that, for calculating an index of an image, and in particular a reference index and/or a current index, it comprises the step of resampling the image as an image with fixed dimensions in advance. The resampled image is hereinafter called the normalized image.

If the image is a color image comprising levels of colors, the method additionally comprises the step of converting the levels of colors of the image to be resampled to levels of gray beforehand.

The normalized image is represented by a matrix of pixel values after discrete quantization of the pixel values.

The method additionally comprises the step of arranging the values according to a predetermined running order of the positions in the matrix, and in particular by concatenating the values of each line of the matrix in the form of a characteristic vector. This vector forms the index.

Preferably, according to the present invention, the method additionally comprises the step of calculating the discrete entropy of the distribution of the values of the reference index or the current index. The entropy is hereinafter called the reference marginal entropy or the current marginal entropy.

The comparison time is optimized by proceeding in this way.

The marginal entropy value may be added to the index.

Calculation of an Index Comparison Distance

Preferably, according to the present invention, the indexes appear in the form of ordered and finite sets of values. These values are identified, in the reference index and the current index, by a system of coordinates.

The method additionally comprises the step of defining, for a given coordinate of the system of coordinates, a pair of values:

of which the first value is the value appearing in the reference index associated with the given coordinate, and of which the second value is the value appearing in the current index associated with the given coordinate.

The method additionally comprises the step of calculating the bidimensional histogram of the pairs of values obtained for all the coordinates of the system of coordinates of the reference index and of the current index.

The method additionally comprises the step of calculating the discrete entropy of the bidimensional histogram, hereinafter called the entropy of the bidimensional histogram.

The method additionally comprises the step of calculating a comparison distance between a reference index and a current index, forming the ratio between the sum of the reference marginal entropy and of the current marginal entropy reduced by the entropy of the bidimensional histogram as the numerator and the sum of the reference marginal entropy and of the current marginal entropy as the denominator.

Extraction of Reference Indexes

Preferably, according to the present invention, the method is such that, to extract reference indexes of the specific audiovisual sequence from the specific audiovisual sequence, it additionally comprises the step of initializing a reference set containing the reference indexes of specific images. This set is initialized with the reference index of the first specific image of the specific audiovisual sequence. The reference index of the first specific image of the specific audiovisual sequence constitutes the first reference index of the reference set.

The method additionally comprises:

(a) the step of calculating, for each specific image of the specific audiovisual sequence, a temporary current index and of calculating a comparison distance between the temporary current index and the last reference index added to the reference set, (b) the step of comparing the comparison distance between the temporary current index and the last reference index added to the reference set to a predetermined threshold SE, (c) the step of adding the temporary current index to the reference set if the comparison distance exceeds the predetermined threshold SE.

The temporary current index becomes the last reference index of the reference set.

The method additionally comprises the step of repeating the steps (a) through (c) up to the end of the specific audiovisual sequence.

Detection

Preferably, according to the present invention, the method is such that, for comparing the reference indexes with the current index of the current image of the monitored flow, it additionally comprises the step of comparing the comparison distance to a predetermined threshold SF so that the specific image is detected within any flow of images when the comparison distance between the reference index of the specific image and the current index is less than the predetermined threshold SF.

According to another embodiment variant of the present invention, the method is more particularly designed to detect a specific audiovisual sequence within any flow of audiovisual sequences. Preferably, in the case of this embodiment variant, the method comprises:

(a) the step of initializing a variable T at −1 and of initializing a variable D at 0, (b) the step of calculating, for each reference index of the reference set, the comparison distance between the reference index of the reference set and the current index.

If the comparison distance thus calculated is less than a predetermined threshold SD, the variable D is increased by one. This condition is hereinafter called the condition for detecting reference indexes.

The moment when the first reference index of the reference set of the specific audiovisual sequence meets the detection condition is hereinafter called the moment of the first detection.

The method additionally comprises the following steps:

(c) the step of assigning to the variable T the time elapsed since the moment of the first detection if the variable D is different from zero, (d) the step of repeating step (b) until the variable D reaches the predetermined threshold SD, or of repeating step (a) if the variable T exceeds the predetermined threshold ST, (e) the step of detecting the specific audiovisual sequence if the variable D reaches the predetermined threshold SD.

The System According to the Present Invention

The system comprises:

first calculation means for calculating a reference index for the specific image, using an indexing process, or first computer analysis means for extracting reference indexes from the specific audiovisual sequence, so as to form a reference set of reference indexes.

The reference index appears in the form of an ordered and finite set of values, and in particular in the form of a characteristic vector, encoding the content of the specific image. The combination of the technical features results in that a reference index characteristic of the specific image and/or of the specific audiovisual sequence is thus obtained. The system comprises:

reception means for receiving the flow of images or audiovisual sequences comprising at least one specific image and/or at least one specific audiovisual sequence, computer processing means for digitizing the flow of images or audiovisual sequences.

The system additionally comprises second calculation means for calculating a current index for the current images of the flow, using the indexing process for the current images of the flow. The current index appears in the form of an ordered and finite set of values, and in particular in the form of a characteristic vector, encoding the content of the current image. The system additionally comprises comparison means for comparing the reference index of the specific image with the current index of the current image of the monitored flow. The combination of the technical features results in that the system makes it possible to detect a specific image within a flow with great precision and extremely fast, while being robust during major photometric alterations.

Indexing Process

Preferably, according to the present invention, the first calculation means for calculating a reference index of a specific image comprise:

sampling means for resampling the specific image as a resampled specific image with fixed dimensions in advance, means for the discrete quantization of the pixel values of the resampled specific image.

After discrete quantization, the resampled specific image is represented by a matrix of the pixel values.

The first means for calculating the reference index of a specific image additionally comprise sequencing means for arranging the pixel values according to a predetermined running order of the positions in the matrix, and in particular by concatenating the values of each line of the matrix in the form of a characteristic vector. The reference index is thus obtained.

If the specific image is a color image comprising levels of colors, the system additionally comprises conversion means for converting the levels of colors of the specific image to be resampled to levels of gray beforehand.

Preferably, according to the present invention, the first calculation means additionally comprise reference processing means for calculating the discrete entropy of the distribution of the values of the reference index. This entropy is hereinafter called the reference marginal entropy.

It is thus possible to optimize the comparison time. It is possible to add this reference marginal entropy value to the reference index.

Preferably, according to the present invention, the system is such that the second calculation means for calculating a current index of a current image comprise:

sampling means for resampling the current image as a current image with fixed dimensions in advance, means for the discrete quantization of the pixel values of the current image.

After discrete quantization, the resampled current image is represented by a matrix of the pixel values.

The second calculation means for calculating a current index of a current image additionally comprise sequencing means for arranging the pixel values according to a predetermined running order of the positions in the matrix, and in particular by concatenating the values of each line of the matrix in the form of a characteristic vector. The current index is thus obtained.

If the current image is a color image comprising levels of colors, the system additionally comprises conversion means for converting the levels of colors of the current image to be resampled to levels of gray beforehand.

Preferably, according to the present invention, the second calculation means additionally comprise current processing means for calculating the discrete entropy of the distribution of the values of the current index. This entropy is hereinafter called the current marginal entropy.

It is thus possible to optimize the comparison time. It is possible to add this current marginal entropy value to the current index.

Calculation of an Index Comparison Distance

Preferably, according to the present invention, each reference index and each current index appear in the form of ordered and finite sets of values. These values are identified, in the reference index and the current index, by a system of coordinates. The system is such that it additionally comprises third calculation means for defining, for a given coordinate of the system of coordinates, a pair of values, of which the first value is the value appearing in the reference index associated with the given coordinate, and of which the second value is the value appearing in the current index associated with the given coordinate. The third calculation means make it possible to calculate the bidimensional histogram of the pairs of values obtained for all the coordinates of the system of coordinates of the reference index and of the current index.

The third calculation means also make it possible to calculate the discrete entropy of the bidimensional histogram, hereinafter called the entropy of the bidimensional histogram.

The third calculation means also make it possible to calculate a comparison distance between a reference index and a current index, forming the ratio between the sum of the reference marginal entropy and of the current marginal entropy reduced by the entropy of the bidimensional histogram as the numerator and the sum of the reference marginal entropy and current marginal entropy as the denominator.

Extraction of Reference Indexes

Preferably, according to the present invention, the system is such that for extracting from the specific audiovisual sequence, made up of specific images, the reference index of the specific audiovisual sequence, it additionally comprises fourth calculation means. These fourth calculation means use a calculation algorithm comprising a step of initializing a reference set containing the reference indexes of the specific images. The reference set is initialized with the reference index of the first specific image of the specific audiovisual sequence. The reference index of the first specific image of the specific audiovisual sequence constitutes the first reference index of the reference set. The calculation algorithm additionally comprises:

(a) the step of (i) calculating, for each specific image of the specific audiovisual sequence, a temporary current index and (ii) of calculating a comparison distance between the temporary current index and the last reference index added to the reference set, (b) the step of comparing the comparison distance between the temporary current index and the last reference index added to the reference set to a predetermined threshold SE, (c) the step of adding the temporary current index to the reference set, if the comparison distance exceeds the predetermined threshold SE.

The temporary current index becomes the last reference index of the reference set. The calculation algorithm additionally comprises the step of repeating the steps (a) through (c) up to the end of the specific audiovisual sequence.

Detection

Preferably, according to the present invention, the system is such that the third calculation means compare the comparison distance between each reference index and the current index of the current image of the monitored flow to a predetermined threshold SF in such a way that the specific image is detected within any flow of images when the comparison distance between the reference index of the specific image and the current index is less than the predetermined threshold SF.

According to another embodiment variant of the present invention, the system is more particularly designed for detecting a specific audiovisual sequence within any flow of audiovisual sequences. In this case, the system comprises initialization means for loading the value −1 in a first register T and the value 0 in a second register D.

In the case of this variant, the system additionally comprises fifth calculation means for calculating, for each reference index of the reference set, the comparison distance between the reference index of the reference set and the current index.

If the comparison distance thus calculated is less than a predetermined threshold SD, the second register D is increased by one. This condition is hereinafter called the condition for detecting reference indexes.

The moment when the first reference index of the reference set of the specific audiovisual sequence meets the detection condition is hereinafter called the moment of the first detection.

The fifth calculation means are equipped for loading in the first register T the time elapsed since the moment of the first detection if the value stored in the second register D is different from zero. The fifth calculation means are equipped (i) for repeating the calculation of the comparison distance until the value stored in the second register D reaches the predetermined threshold SD, or (ii) for repeating the use of the initialization means if the value stored in the first register T exceeds a predetermined threshold ST.

In such a way that the specific audiovisual sequence is said to be detected if the stored value of the second register D reaches the predetermined threshold SD.

Mathematical Precisions about the Nature of the Comparison Function Used in the Present Invention The method that is the subject of the present invention makes it possible to detect proprietary audiovisual sequences within a video flow to be analyzed. This method is based on the existence of a comparison distance making it possible to compare any two images.

This function has the property of returning a low value, close to 0, when the two images are different and returning a high value when the two images are superimposable, even in the presence of significant photometric transformations between the two images, i.e., profoundly changing the pixel values of an image.

Section 1 defines the function used for the comparison, and section 2 shows why the detection takes place under the given, even difficult, conditions.

1. Mutual Information between Two Random Variables

Originating from the field of statistics, the concepts mentioned below are known and can be found in technical works presenting the foundations of the theory of communications, for example, in Information Theory, by Robert B. Ash, Dover Publications Inc.

1.1 Concept of Discrete Entropy

If X is a random variable having discrete values $\{x\_1, \ldots x\_n\}$ with the corresponding distribution of probabilities $\{p\_1, \ldots p\_n\}$ (i.e., $p(X=x\_1)=p\_1, \ldots, p(X=x\_n)=p\_n$), the discrete entropy of X is by definition:

$$H(X) = -\Sigma px\_ix \log(px\_i)$$

1.2 Concept of Joint Discrete Entropy

If X is a random variable having discrete values $\{x\_1, \ldots x\_n\}$ with the corresponding distribution of probabilities $\{px\_1, \ldots px\_n\}$;

If Y is a random variable having discrete values $\{y\_1, \ldots y\_n\}$ with the corresponding distribution of probabilities $\{py\_1, \ldots py\_n\}$;

If the joint random variable $Z=(X, Y)$, having by definition the discrete values $\{(x\_1, y\_1), \ldots, (x\_n, y\_n)\}$ provided with the corresponding distribution of probabilities $\{pz\_11, \ldots pz\_nn\}$ in such a way that $p(X=x\_1, Y=y\_1)=pz\_11, \ldots, p(X=x\_n, Y=y\_n)=pz\_nn$, then the joint discrete entropy of $Z=(X, Y)$ is by definition $$H(Z)=H(X, Y)=-\Sigma_{i,j} pz\_ij \times \log(px\_ij)$$

1.3 Concept of Conditional Discrete Entropy

If X is a random variable having discrete values $\{x\_1, \ldots x\_n\}$ with the corresponding distribution of probabilities $\{px\_1, \ldots px\_n\}$;

If Y is a random variable having discrete values $\{y\_1, \ldots y\_n\}$ with the corresponding distribution of probabilities $\{py\_1, \ldots py\_n\}$;

If the conditional discrete random variable $W=(X|Y)$, declaring "X knowing Y", having by definition discrete values $\{(x\_1|y\_1), \ldots, (x\_n|y\_n)\}$ provided with the corresponding distribution of probabilities $\{pw\_11, \ldots pw\_nn)\}$ in such a way that $p(X=x\_1|Y=y\_1)=pw\_11, \ldots, p(X=x\_n|Y=y\_n)=pw\_nn)$, then the conditional discrete entropy of $W=(X|Y)$ is by definition $$H(Z)=H(X, Y)=-\Sigma_{i,j} pw\_ij \times \log(pw\_ij)$$

It is not difficult to prove that $H(X,Y)=H(X|Y)+H(Y)$.

1.4 Concept of Mutual Information

The mutual information $MI(X,Y)$ between two random variables X and Y is by definition:

$$MI(X,Y)=H(X)+H(Y)-H(X,Y)$$

$$MI(X,Y)=H(X)-H(X|Y)$$

$$MI(X,Y)=H(Y)-H(Y|X)$$

1.5 Concept of Normalized Mutual Information

The normalized mutual information $NMI(X,Y)$ between two random variables X and Y is by definition given by the following formula:

$$NMI(X,Y)=MI(X,Y)/(H(X)+H(Y))$$

The concept of comparison distance entering into the definition of the technical features of the present invention corresponds to NMI.

1.5.1 Case of Independent Variables

If X and Y are independent, then by definition $H(X|Y)=H(X)$, and thus $NMI(X,Y)=0$.

1.5.2 Case of Functionally Linked Variables

If $Y=f(X)$, then $H(Y|X)=H(f(X)|X)=0$, because the value of the random variable $f(X)$ is entirely determined by the knowledge of X. Referring to the definition of mutual information, the remarkable simplification is obtained:

$$MI(X,Y)=H(Y)=H(f(X))$$

therefore, $$NMI(X,Y)=H(f(X))/(H(X)+H(f(X)))$$

2. Detection of Images by Normalized Mutual Information

2.1 Images, Histograms and Random Variables

The image detection method according to the present invention is based on the definitions and properties that were just explained.

In fact:

The normalized histogram of the levels of gray of an image I, obtained by calculating the histogram of the values taken by I(x) for x having all the possible positions in the image, is a distribution of discrete probabilities making it possible, by extension, to define "the entropy of an image," see paragraph 1.1.

The normalized joint histogram of the levels of gray of two images I1 and I2 of the same size, obtained by calculating the bidimensional histogram of the values taken by (I1 $(x)$, I2 $(x)$) for x having all the possible positions in the image I1, is a bidimensional distribution of probabilities making it possible, by extension, to define "the joint entropy between two images," "the conditional entropy between two images," "the mutual information between two images," "the normalized mutual information between two images," respectively, see paragraphs 1.2, 1.3, 1.4 and 1.5, respectively.

Thus, the comparison distance used for proceeding with detections is $NMI(X,Y)$, where X and Y are two images.

2.2 Detection Criterion

To detect a specific image, the comparison distance $NMI(X,Y)$ is compared to a predetermined threshold, fixed in advance. If the distance between the current image, which is the candidate for the detection, and the reference image is less than this threshold, the current image is declared "recognized" or detected.

2.3 Robustness During Photometric Transformations

In theory, the image to be detected is the exact copy of the reference image. However, in practice, the image to be detected generally has passed through a noisy transmission channel, Hertzian waves, television receiver, satellite, magnetoscope, etc. This noise may be expressed either as high-frequency noise in the image but also as a low-frequency deformation of the signal, change in contrast or in brightness, saturation, etc.

Thus, it is essential that the detection technique be robust during these photometric changes.

The distance $NMI(X,Y)$ has the advantage of not directly comparing the pixel values of two images (a simple approach used, for example, in a correlation distance but unusable in practice because of its lack of robustness). On the other hand, the distance $NMI(X,Y)$ has the advantage of calculating the capacity to predict the pixel values of X knowing those of Y, without a particular hypothesis about the nature of the photometric transformation linking X and Y.

In other words, the distance $NMI(X,Y)$ remains minimal if X and Y correspond with one another geometrically, even if their intensity surfaces are not directly superimposable. Therefore, the detection is extremely robust during photometric changes.

BRIEF DESCRIPTION OF THE DRAWINGS

Other features and advantages of the present invention will become apparent after reading the description of embodiment variants of the present invention given by way of indicative and nonlimiting example and FIG. 1 which schematically shows any flow 3 of image 6 containing a specific image 11, and in particular a proprietary image 4 that should be detected, FIG. 2 which schematically shows the technical means making it possible to calculate a reference index 10 of a specific image 11, FIG. 3 which schematically shows the form in which a reference index can appear, FIG. 4 which schematically shows the indexing process 39 making it possible to calculate an index 8, and in particular a current index 14 in order to compare it to a reference index 10, FIG. 5 which schematically shows a flow 3 of audiovisual sequences 7 containing a specific audiovisual sequence 2, and in particular a proprietary audiovisual sequence 4, FIG. 6 which schematically shows the technical means making it possible to calculate a reference set 30 made up of reference indexes 10 from a specific audiovisual sequence 2, FIG. 7 which schematically shows the form in which a reference index 10 of a reference set 30 can appear, FIG. 8 which schematically shows the indexing process 39 making it possible to calculate an index 8, and in particular a current index 14 of a current image 13 of any audiovisual sequence 7, in order to compare it to a reference index 10, FIG. 9 which schematically shows an embodiment of a process for indexing a specific image 11 in the case of the first embodiment variant as in the case of second embodiment variant, FIG. 10 which schematically shows an embodiment of a process for indexing a current image 13 in the case of the first embodiment variant as in the case of the second embodiment variant, FIG. 11 which schematically shows an embodiment of the pairs of values 25, 26 making up a reference index 21a and a current index 21b, FIG. 12 which schematically shows the technical means making it possible to calculate a comparison distance 29, FIG. 13 which schematically shows an embodiment of the technical means making it possible to extract the reference indexes 10 and to form a reference set 30 in the case of the second embodiment variant, FIG. 14 which schematically shows an embodiment of the technical means making it possible to detect a specific audiovisual sequence 2 in the case of the second embodiment variant, FIG. 15 which schematically shows, in the case of the second embodiment variant, the flow chart of the algorithm making it possible to detect a specific audiovisual sequence 2 using the technical means described with reference to FIG. 12.

DETAILED DESCRIPTION

First Embodiment Variant

In the case of the first embodiment variant of the present invention which will now be described with reference to FIGS. 1, 2, 3 and 4, the system is designed for identifying a specific image 11 within any flow 3 of images 6. The objective is to identify a proprietary image 4 in the flow 3.

In the case of this first embodiment variant, the system comprises first calculation means 38 for calculating a reference index 10 for each specific image 11, using an indexing process 39. Such an indexing process 39 shall be described in detail below.

The reference index 10 (FIG. 3) appears in the form of an ordered and finite set 21a of values 20a, and in particular in the form of a characteristic vector 9a, encoding the content of the specific image 11. A reference index 10 characteristic of the specific image 11 is thus obtained.

The system additionally comprises reception means 41 for receiving the flow 3 of images 6 capable of comprising at least one specific image 11. The system additionally comprises computer processing means 42 for digitizing the flow 3 of images 6. The system additionally comprises second calculation means 43 for calculating a current index 14 for the current images 13 of the flow 3. These second calculation means 43 calculate the current index 14 using an indexing process 39 comparable to the one used for the calculation of the reference indexes 10 of the specific images 11. Just as the reference index 10, the current index 14 appears in the form of an ordered and finite set 21b of values 20b, and in particular in the form of a characteristic vector 9b encoding the content of the current image 13.

The system additionally comprises comparison means 44 for comparing the reference index 10 of the specific image 11 with the current index 14 of the current image 13 of the monitored flow 3. It is thus possible to detect a specific image 11 within a flow 3 with great precision and extremely fast, while being robust during major photometric alterations.

An embodiment variant of the technical means making it possible to perform this detection shall be described in greater detail below with reference to FIG. 12.

Second Embodiment Variant

In the case of the second embodiment variant of the present invention which will now be described with reference to FIGS. 5, 6, 7 and 8, the system is designed for identifying a specific audiovisual sequence 2 within any flow 3 of audiovisual sequences 7.

The objective is to identify a proprietary audiovisual sequence 5 in the flow 3.

In the case of this second embodiment variant, the system comprises first computer analysis means 40 for extracting reference indexes 10 from the specific audiovisual sequence 2, so as to make up a reference set 30 of reference indexes 10.

Each reference index 10 of the reference set 30 is calculated by calculation means 38 using an indexing process 39 comparable to the one that was described in the case of the first embodiment variant. Each reference index 10 appears in the form of an ordered and finite set 21b of values 20b, and in particular in the form of a characteristic vector 9b encoding the content of each specific image 11 of the specific audiovisual sequence 2. A reference set 30 characteristic of the specific audiovisual sequence 2 is thus obtained.

The system additionally comprises reception means 41 for receiving the flow 3 of audiovisual sequences 7 capable of comprising at least one specific audiovisual sequence 2.

The system additionally comprises computer processing means 42 for digitizing the flow 3 of audiovisual sequences 7. In the case of this second embodiment variant, the technical means used to calculate the current index 14 of each current image 13 of an audiovisual sequence 7 will not be described. In fact, they are comparable to those described in the case of the first embodiment variant.

The system additionally comprises comparison means 44 for comparing the reference indexes 10 of the specifics images 11 making up a specific audiovisual sequence 2 with the current indexes 14 of the current images 13 of the monitored flow 3. It is thus possible to detect a specific audiovisual sequence 2 within a flow 3 with great precision and extremely fast, while being robust during major photometric alterations.

An embodiment variant of the technical means making it possible to perform this detection shall be described in greater detail below with reference to FIGS. 14 and 15.

The technical means, in particular the first calculation means 38 and the second calculation means 43, used to calculate the reference indexes 10 or to calculate the current indexes 14, might be combined in the same computer system; however, calculating the reference indexes 10 in systems other than those used to calculate the current indexes 14 is not departing from the field of the present invention. This remark concerns both the first embodiment variant and the second embodiment variant.

Indexing Process

In the case of the first embodiment variant of the present invention as in the case of the second embodiment variant, the first calculation means 38 and the second calculation means 43 for calculating the reference indexes 10 and the current indexes 14 use an indexing process, which will now be described with reference to an embodiment shown in FIGS. 9 and 10. The term "index" was used to designate a reference index 10 or a current index 14 when no distinction was made between them.

The elements having comparable functions for calculating the reference indexes 10 and the current indexes 14 were referenced with the same reference numbers in the figures.

The first calculation means 38 for calculating a reference index 10 of a specific image 11 comprise sampling means 45 for resampling the specific image 11 as a resampled specific image with fixed dimensions in advance. This resampled specific image is hereinafter called the normalized specific image 11b. In order to calculate the reference indexes 10, the first calculation means 38 additionally comprise means for the discrete quantization 46 of the pixel values of the specific image 11 resampled 11b. After discrete quantization, the specific image 11 resampled is represented by a matrix 19 of the pixel values 17. The first means for calculating 38 the reference index 10 of a specific image 11 additionally comprise sequencing means 47 for arranging the pixel values 17 according to a predetermined running order of the positions 18 in the matrix 19, and in particular by concatenating the values of each line of the matrix in the form of a characteristic vector 9a. The reference index 10 is thus obtained.

If the specific image 11 is a color image comprising levels of colors, the system additionally comprises conversion means 48 for converting the levels of colors of the specific image 11 to be resampled to levels of gray beforehand.

Preferably, according to the present invention, the first calculation means 38 additionally comprise reference processing means 49a for calculating the discrete entropy of the distribution of the values of the reference index 10. This entropy is hereinafter called the reference marginal entropy 50a.

The comparison time of two indexes is the time needed to calculate the comparison distance between the indexes. By adding this reference marginal entropy value 50a to the reference index 10, the calculation of the comparison distance no longer requires the calculation of the reference entropy value 50a. The comparison time is thus reduced.

It is possible to add this reference marginal entropy value 50a to the reference index 10.

Preferably also according to the present invention, the second calculation means 43 for calculating a current index 14 of a current image 13 comprise sampling means 45 for resampling the current image 13 as a current image with fixed dimensions in advance. This resampled current image is hereinafter called the normalized current image 13b. The second calculation means 43 also comprise, for calculating a current index 14 of a current image 13, means for the discrete quantization 46 of the pixel values of the current image 13. After discrete quantization, the current image 13 resampled is represented by a matrix 19 of the pixel values 17. The second calculation means 43 additionally comprise, for calculating a current index 14 of a current image 13, sequencing means 47 for arranging the pixel values according to a predetermined running order of the positions 18 in the matrix, and in particular by concatenating the values of each line of the matrix in the form of a characteristic vector 9b. The current index 14 is thus obtained.

If the current image 13 is a color image comprising levels of colors, the system additionally comprises conversion means 48 for converting the levels of colors of the current image 13 to be resampled to levels of gray beforehand.

Preferably, according to the present invention, the second calculation means 43 additionally comprise current processing means 49b for calculating the discrete entropy of the distribution of the values of the current index 14. This entropy is hereinafter called the current marginal entropy 50b.

It is thus possible to optimize the comparison time. It is possible to add this current marginal entropy value 50b to the current index 14.

The reference 16 was sometimes used to designate a normalized specific image whether it was a normalized specific image 11b or a normalized current image 13b.

Calculation Of An Index Comparison Distance

In the case of the first embodiment variant of the present invention as in the case of the second embodiment variant, the system comprises comparison means 44 for (i) comparing the reference index 10 of the specific image 11 with the current index 14 of the current image 13 of the monitored flow 3 or for (ii) comparing the reference indexes 10 of the specific images 11 making up a specific audiovisual sequence 2 with the current indexes 14 of the current images 13 of the monitored flow 3.

An advantageous embodiment of the technical means making it possible to perform these comparisons shall now be described with reference to FIGS. 11 and 12. For this purpose, the concept of comparison distance 29 in terms of the present invention should be explained.

Just as this was described above, each reference index 10 and each current index 14 appear in the form of ordered and finite sets 21a and 21b of values 20a and 20b. Therefore, it is possible to identify these values 20a and 20b in the reference index 10 and the current index 14 by a system of coordinates 22.

The system additionally comprises third calculation means 52 for defining, for a given coordinate 24 of the system of coordinates 22, a pair of values 25, 26, of which the first value 25 is the value appearing in the reference index 10 associated with the given coordinate 24, and of which the second value 26 is the value appearing in the current index 14 associated with the given coordinate 24.

The third calculation means 52 make it possible to calculate the bidimensional histogram 27 of the pairs of values 25, 26 obtained for all the coordinates of the system of coordinates of the reference index 10 and of the current index 14.

The third calculation means 52 also make it possible to calculate the discrete entropy of the bidimensional histogram, hereinafter called the entropy of the bidimensional histogram 28.

The third calculation means 52 also make it possible to calculate a comparison distance 29 between a reference index 10 and a current index 14, forming the ratio between the sum of the reference marginal entropy 50a and of the current marginal entropy 50b reduced by the entropy of the bidimensional histogram 28 as the numerator and the sum of the reference marginal entropy 50a and of the current marginal entropy 50b as the denominator.

Extraction of Reference Indexes

Now that the concept of comparison distance 29 between a reference index 10 and a current index 14 has been explained, it is possible to complete the description of the second variant of the present invention in the case of an advantageous embodiment with reference to FIG. 13. In the case of this advantageous embodiment, designed to make it possible to detect a specific audiovisual sequence 2 within a flow 3 of audiovisual sequences 7, one proceeds beforehand with a phase of extracting reference indexes 10 so as to form a reference set 30.

To extract the reference indexes 10 of the specific audiovisual sequence 2 from the specific audiovisual sequence 2, made up of specific images 11, the system additionally comprises fourth calculation means 53. These fourth calculation means 53 use a calculation algorithm 54 comprising a step of initializing a reference set 30 containing the reference indexes 10 of specific images. The reference set 30 is initialized with the reference index 100 of the first specific image 110 of the specific audiovisual sequence 2. The reference index 100 of the first specific image 110 of the specific audiovisual sequence 2 constitutes the first reference index of the reference set 30. The calculation algorithm 54 additionally comprises:

(a) the step of (i) calculating, for each specific image 11 of the specific audiovisual sequence 2, a temporary current index 31 and (ii) of calculating a comparison distance 29 between the temporary current index 31 and the last reference index 32 added to the reference set 30, (b) the step of comparing the comparison distance 29 between the temporary current index 31 and the last reference index 32 added to the reference set 30 to a predetermined threshold SE 33, (c) the step of adding the temporary current index 31 to the reference set 30, if the comparison distance 29 exceeds the predetermined threshold SE 33.

The temporary current index 31 thus becomes the last reference index 32 of the reference set 30. The calculation algorithm 54 additionally comprises the step of repeating the steps (a) through (c) up to the end of the specific audiovisual sequence 2.

Detection

The final phase of the method of detecting the specific image 11, and in particular the proprietary image 4, within any flow 3 of images 6 shall now be described in the case of the first embodiment variant with reference to FIG. 12. For this purpose, the third calculation means 52 compare the comparison distance 29 between each reference index 10 and the current index 14 of the current image 13 of the monitored flow 3 to a predetermined threshold SF 65. The specific image 11 is said to be detected within any flow 3 of images 6 when the comparison distance 29 between the reference index 10 of the specific image 11 and the current index 14 is less than the predetermined threshold SF 65.

The final phase of the method of detecting the specific audiovisual sequence 2, and in particular the proprietary audiovisual sequence 5, within any flow 3 of audiovisual sequences 7 shall now be described in the case of the second embodiment variant with reference to FIGS. 14 and 15. In this case, the system comprises initialization means 57 for loading the value −1, minus one, of a variable T 34, in a first register T 55, and the value 0, zero, of a variable D 35, in a second register D 56.

In the case of this embodiment variant, the system additionally comprises fifth calculation means 58 for calculating, for each reference index 10 of the reference set 30, the comparison distance 29 between the reference index 10 considered of the reference set 30 and the current index 14 of a current image 13 of the monitored flow 3.

If the comparison distance 29 thus calculated is less than a predetermined threshold SD 59, the second register D 56 is increased by one. This condition is hereinafter called the condition for detecting reference indexes 10.

The moment when the first reference index 10 of the reference set 30 of the specific audiovisual sequence 2 meets the detection condition is hereinafter called the moment of the first detection.

The fifth calculation means 58 are equipped for loading in the first register T 55 the time elapsed since the moment of the first detection if the value stored in the second register D 56 is different from zero. The fifth calculation means 58 are equipped (i) for repeating the calculation of the comparison distance 29 until the value stored in the second register D 56 reaches the predetermined threshold SD 59, or (ii) for repeating the use of the initialization means if the value stored in the first register T 55 exceeds a predetermined threshold ST 60.

In such a way that the specific audiovisual sequence 2 can be said to be detected if the value stored in the second register D 56 reaches the predetermined threshold SD 59.

FIG. 15 shows the flow chart of the algorithm that was just described.

The invention claimed is:

1. A method for identifying a specific image or a specific audiovisual sequence within a flow of images or audiovisual sequences, and the method comprising the steps of:

receiving a stream of digitized image signals representative of the images, and executing an indexing process by a processor, the processor executing the indexing process to calculate for each said digitized image signal, an index appearing in the form of an ordered and finite set of values, thereby digitally encoding the image;

calculating a reference index, using the indexing process for the specific image, or extracting reference indexes from the specific audiovisual sequence, so as to form a reference set of said reference indexes, such that said reference indexes that are characteristic of the specific image or of the specific audiovisual sequence are obtained;

receiving the index signal and calculating a current index for the current image of the flow, using the indexing process for the current image of the flow;

comparing the reference indexes with the current index of the current image of the flow, wherein the indexes appear in the form of ordered and finite sets of values identified, in the reference index and the current index, by a system of coordinates;

defining, for a given coordinate of the system of coordinates, a pair of values, of which:

a first value of the pair of values is the value appearing in the reference index associated with the given coordinate, and a second value of the pair of values is the value appearing in the current index associated with the given coordinate, calculating a bidimensional histogram of the pairs of values obtained for all the coordinates of the system of coordinates of the reference index and of the current index;

calculating a discrete entropy of the bidimensional histogram;

calculating a discrete reference marginal entropy of the distribution of the values of the reference index or a discrete current marginal entropy of the current index, wherein the reference marginal entropy or the current marginal entropy is configured to be added to the reference index or the current index, respectively; and calculating a comparison distance between the reference index and the current index, using the reference marginal entropy, the current marginal entropy and the entropy of the bidimensional histogram, wherein a specific image is detected within the flow, using the comparison distance.

2. A method in accordance with claim 1 wherein the calculation of at least one of the reference index or the current index additionally comprises the steps of:

resampling the image as a normalized image with fixed dimensions in advance;

converting levels of colors of the image to be resampled to levels of grayscale if the image is a color image, wherein the normalized image is represented by a matrix of said pixel values after discrete quantization of the pixel values; and arranging the quantized pixel values according to a predetermined running order of the positions in the matrix, to obtain the reference index or current index.

3. A method in accordance with one of the claims 1 or 2, wherein the step of calculating the comparison distance between the reference index and the current index is performed by forming a ratio between a sum of the reference marginal entropy and of the current marginal entropy reduced by the entropy of the bidimensional histogram as the numerator and a sum of the reference marginal entropy and the current marginal entropy as the denominator.

4. A method in accordance with claim 3 wherein, the method additionally comprises the steps of:

initializing a reference set containing the reference indexes of specific images with a first reference index of a first specific image of the specific audiovisual sequence;

(a) calculating, for each said specific image of the specific audiovisual sequence, a temporary current index and calculating a comparison distance between the temporary current index and a last reference index added to the reference set;

(b) comparing the comparison distance between the temporary current index and the last reference index added to the reference set to a predetermined threshold SE;

(c) adding the temporary current index to the reference set, if the comparison distance exceeds the predetermined threshold SE, the temporary current index being the last reference index of the reference set;

repeating the steps (a) through (c) up to the end of the specific audiovisual sequence.

5. A method in accordance with claims 1 or 2 additionally comprising the steps of:

comparing the comparison distance to a further predetermined threshold SF, wherein in the case of said flow of said images, the specific image is detected if the comparison distance between the reference index of the specific image and the current index is less than the further predetermined threshold SF.

6. A method in accordance with claim 4, the method additionally comprising the steps of:

(a) initializing a variable T at a value of −1, initializing a variable D at a value of 0, (b) calculating, for each said reference index of the reference set, the comparison distance between the reference index of the reference set and the current index, wherein if the comparison distance is less than a predetermined threshold SD, a detection condition is met and the variable D is increased by one, and wherein a moment of a first detection is when the first said reference index of the reference set of the specific audiovisual sequence meets the detection condition; and (c) assigning a time elapsed since the moment of the first detection to the variable T if the variable D is different from zero, (d) repeating step (b) until the variable D reaches the predetermined threshold SD, or repeating step (a) if the variable T exceeds a predetermined threshold ST, (e) detecting the specific audiovisual sequence if the variable D reaches the predetermined threshold SD.

7. A system for identifying a specific image or a specific audiovisual sequence within a flow of digitized images or audiovisual sequences, the system comprising:

first calculation means for calculating a reference index for the specific digitized image, using a indexing process, or first computer analysis means for extracting reference indexes from the specific audiovisual sequence, so as to form a reference set of reference indexes;

reception means for receiving the flow of said digitized images or said audiovisual sequences comprising at least one specific digitized image or at least one specific audiovisual sequence;

wherein the reference index is an ordered and finite set of values, and wherein a reference index characteristic of the at least one specific image or of the specific audiovisual sequence is obtained;

second calculation means for calculating a current index for current images of the flow, using the indexing process for the current images of the flow, the current index appearing in the form of a ordered and finite set of values, encoding the content of the current image;

comparison means for comparing the reference index of the specific image with the current index of the current image of the monitored flow;

the first calculation means additionally comprising reference processing means for calculating a discrete reference marginal entropy of the distribution of values of the reference index, wherein the comparison time is optimized, and the reference marginal entropy value is configured to be added to the reference index, the second calculation means additionally comprising current processing means for calculating a discrete current marginal entropy of the distribution of values of the current index, wherein the comparison time is optimized and the current entropy value is configured to be added to the current index, wherein the reference indexes and the current indexes are in the form of ordered and finite sets of values identified, in the reference index and the current index, by a system of coordinates; and third calculation means for:

defining, for a given coordinate of the system of coordinates, a pair of values, a first value of the pair being a value appearing in the reference index associated with the given coordinate, and a second value of the pair being a value appearing in the current index associated with the given coordinate, calculating a bidimensional histogram of the pairs of values obtained for all the coordinates of the system of coordinates of the reference index and the current index, calculating a discrete entropy of the bidimensional histogram, and calculating a comparison distance between the reference index and the current index, using the reference marginal entropy, the current marginal entropy and the entropy of the bidimensional histogram, whereby a specific image within the flow is detected.

8. A system in accordance with claim 7, wherein the first calculation means further comprises:
- sampling means for resampling the specific image as a resampled specific image with fixed dimensions;
- quantization means for discrete quantization of the pixel values of the specific image resampled wherein the resampled specific image is represented by a matrix of pixel values, after discrete quantization; and
- sequencing means for arranging the pixel values according to a predetermined running order of positions in the matrix, to obtain the reference index; and
- conversion means for converting levels of colors of the specific image to be resampled to levels of grayscale, if the specific image is a color image.

9. A system in accordance with claims 7 or 8, wherein the second calculation means further comprises:
- current image sampling means for resampling the current image as a current image with fixed dimensions;
- current image quantization means for discrete quantization of the pixel values of the current image wherein the resampled current image is represented by a matrix of pixel values, after discrete quantization;
- current image sequencing means for arranging the pixel values of the current image according to a predetermined running order of positions in the matrix to obtain the current index; and
- current image conversion means for converting the levels of colors of the current image to be resampled to levels of grayscale, if the current image is a color image.

10. A system in accordance with claims 7 or 8, in which the third calculation means calculates the comparison distance between the reference index and the current index, by forming a ratio between a sum of the reference marginal entropy and the current marginal entropy reduced by the entropy of the bidimensional histogram as the numerator and a sum of the reference marginal entropy and the current marginal entropy as the denominator.

11. System in accordance with claim 10, wherein, the system additionally comprises:
- fourth calculation means executing a calculation algorithm, the calculation algorithm comprising the steps of:
  - initializing a reference set containing the reference indexes of the specific images with the first reference index of the first specific image of the specific audiovisual sequence;
  - (a) calculating, for each said specific image of the specific audiovisual sequence, a temporary current index and calculating a comparison distance between the temporary current index and a last reference index added to the reference set;
  - (b) comparing the comparison distance between the temporary current index and the last reference index added to the reference set to a predetermined threshold SE;
  - (c) adding the temporary current index to the reference set, if the comparison distance exceeds the predetermined threshold SE, the temporary current index becoming the last reference index of the reference set; and
  - repeating the steps (a) through (c) up to the end of the specific audiovisual sequence.

12. A system in accordance with claim 10,
wherein the third calculation means compares the comparison distance between the reference indexes and the current index of the current image of the flow to a further predetermined threshold SF; and
wherein in the case of said flow of said images, the specific image is detected provided that the comparison distance between the reference index of the specific image and the current index is less than the further predetermined threshold SF.

13. A system in accordance with claim 11, the system being designed for detecting a specific audiovisual sequence within said flow of said audiovisual sequences, the system additionally comprising:
- initialization means for loading a value −1 in a first register T, and a value 0 in a second register D;
- fifth calculation means for calculating, for each said reference index of the reference set, a further comparison distance between the reference index of the reference set and the current index,
- wherein, if a condition for detecting said reference indexes is met where the comparison distance is less than a predetermined threshold SD, the value in the second register D is increased by one,
- wherein a moment of the first detection is when the first reference index of the reference set of the specific audiovisual sequence meets the detection condition,
- wherein the fifth calculation means loads in the first register T, the time elapsed at the moment of the first detection if the value in the second register D is different from zero,
- wherein the fifth calculation means repeats the calculation of the comparison distance, until the value stored in the second register D reaches the predetermined threshold SD, or, for repeating the use of the initialization means, if the value stored in the first register T exceeds a predetermined threshold ST, and
- wherein the specific audiovisual sequence is detected if the value stored in the second register D reaches the predetermined threshold SD.

* * * * *